United States Patent [19]

Yokoi

[11] Patent Number: 4,720,777

[45] Date of Patent: Jan. 19, 1988

[54] PULSE WIDTH MODULATION SYSTEM FOR AC MOTOR DRIVE INVERTERS

[75] Inventor: Osamu Yokoi, Mie, Japan

[73] Assignee: Kabushiki Kaisha Toshiba, Kawasaki, Japan

[21] Appl. No.: 930,530

[22] Filed: Nov. 14, 1986

[30] Foreign Application Priority Data

Nov. 18, 1985 [JP] Japan .................. 60-258337

[51] Int. Cl.$^4$ ........................................... H02M 7/757
[52] U.S. Cl. ........................................ 363/41; 363/96; 318/811
[58] Field of Search .............. 363/41, 96–98, 363/132, 136–138; 318/801, 807–811

[56] References Cited

U.S. PATENT DOCUMENTS

| | | | |
|---|---|---|---|
| 4,321,518 | 3/1982 | Akamatsu | 318/810 X |
| 4,447,786 | 5/1984 | Saar et al. | 363/41 X |
| 4,587,605 | 5/1986 | Kouyama et al. | 363/41 |

OTHER PUBLICATIONS

Conference Record of International Power Electronics Conference; (1983); pp. 407–417.

*Primary Examiner*—Peter S. Wong
*Attorney, Agent, or Firm*—Schwartz, Jeffery, Schwaab, Mack, Blumenthal & Evans

[57] ABSTRACT

A pulse width modulation system for AC motor drive inverters consists of a ROM for storing data of values of $\cos \theta$ and $\cos(\theta - \pi/3)$ with respect to a phase $\theta$ in the range of electrical angle of 60°, a programmable counter for counting the phase $\theta$, an operational circuit for performing logical operations to evaluate each period of time for which a three phase AC motor is energized in accordance with each switching pattern, and a programmable timer for counting each period of time for which the motor is energized in accordance with each switching pattern. The motor is energized in accordance with each switching pattern for the period of time the data of which is gained at the operational circuit so that three phase output voltage resultant vectors form a circular locus.

1 Claim, 9 Drawing Figures

PULSE WIDTH MODULATION SYSTEM FOR AC MOTOR DRIVE INVERTERS

BACKGROUND OF THE INVENTION

1. Field of the Invention

The present invention generally relates to pulse width modulation control in an inverter employed for speed control of a three phase AC motor, and more particularly to a system which controls the supply of the pulse width modulation signals so that three phase output voltage resultant vectors form a circular locus.

2. Description of the Prior Art

Several systems for supplying pulse width modulation signals have been known in prior art types of pulse width modulated voltage-source inverters employed for speed control of a three phase AC motor. One of such systems is disclosed in an article entitled "Improved PWM Method For Induction Motor Drive Inverters" published in the conference record of International Power Electronics Conference held in Tokyo on Mar. 27-31, 1983. In the prior art systems, in order that torque ripples may be lessened, the supply of the pulse width modulation signals is controlled so that a locus of three phase output voltage resultant vectors becomes a circle. FIG. 6 illustrates a three phase bridged inverter comprising six switching elements $S_1$-$S_6$. As shown in FIG. 7, line voltage resultant vectors directed between respective phases U, V and W are of eight kinds, which number corresponds to the number of combination in on-off states of the switching elements $S_1$-$S_6$, that is, the number of switching patterns. In each phase, each line voltage vector is split into two voltage vectors Va and Vb in accordance with the phase $\theta$, as shown in FIG. 8. Where the pulse width modulation signals are supplied so that the switching elements $S_1$-$S_6$ are turned on and off in accordance with the switching patterns in which each line voltage resultant vector is split into two vectors Va and Vb, the locus of the three phase output voltage resultant vectors becomes a circle.

FIG. 9 shows a prior art control circuit emboding the above-described method of controlling the supply of pulse width modulation signals. A counter 1 counts clock pulses $f\omega$ which are proportional to an established frequency. The counter 1 in operation is latched by a latch circuit 2 and the content of the clock pulse $f\omega$ at the time when the counter 1 is latched represents the phase $\theta$ and is addressed as a higher address in a read only memory (hereinafter referred to as ROM) 3. A counter 4 counts reference clock pulses and the value gained by the counting operation of the counter 4 is addressed as a higher address in a ROM 5. A voltage command is addressed as a higher address in the ROM 5. A trapezoidal wave Ed provided by the ROM 5 is addressed as a lower address in the ROM 3. Data of the switching patterns in which the voltage resultant vectors corresponding to the output data of the ROM 5 and the phase $\theta$ are moved in the range of the electrical angle of 360° are written in the ROM 3. The ROM 3 outputs data of the switching patterns in which the voltage vectors Va and Vb shown in FIG. 8 are supplied in accordance with the output data Ed of the ROM 5 and the phase $\theta$.

According to the above-described control circuit, however, when eight bits (corresponding to electrical angle resolution of approximately 1.4°) are required for the phase $\theta$ stored in the ROM 3 and the output data Ed of the ROM 5, the ROM 3 needs to have a capacity of 64K bytes. The capacity of the ROM 3 is further increased as the resolution of the phase $\theta$ is enhanced. The ROM 5 also requires a capacity of 64K bytes where eight bits are required for the voltage command data and the counter 4 respectively. Consequently, the control circuit becomes complicated and expensive.

SUMMARY OF THE INVENTION

It is therefore an object of the present invention to provide an improved pulse width modulation system for AC motor drive inverters which precisely controls the supply of the pulse width modulation signals though inexpensive ROM's each having a relatively small capacity.

According to the present invention, based on the phase and the voltage command, each period of time during which the motor is energized in accordance with each switching pattern is obtained at an operational circuit. The pulse width modulation signals are supplied so that three phase output voltage resultant vectors form a circular locus, by energizing the motor in accordance with each switching pattern for each period of time which is obtained by the operation of the operational circuit. The control circuit is simplified so that each ROM stores the the data for obtaining each period of time during which the motor is energized in accordance with each switching pattern in the range of 60°, not in the range of 360°.

These and other objects and many attendant advantages of this invention will be readily appreciated by referring to the following description of a preferred embodiment and a claim, taken in conjunction with accompanying drawings.

DESCRIPTION OF A PREFERRED EMBODIMENT

Figure 3:
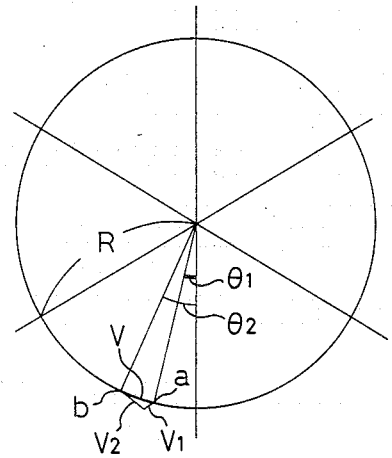
FIG. 3 is a vectorial representation of the principle in FIG. 2.
Figure 6:
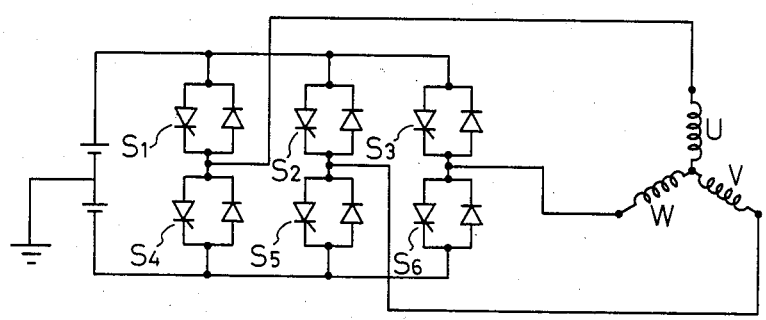
FIG. 6 is a diagram showing the wiring of the inverter.
Figure 7:
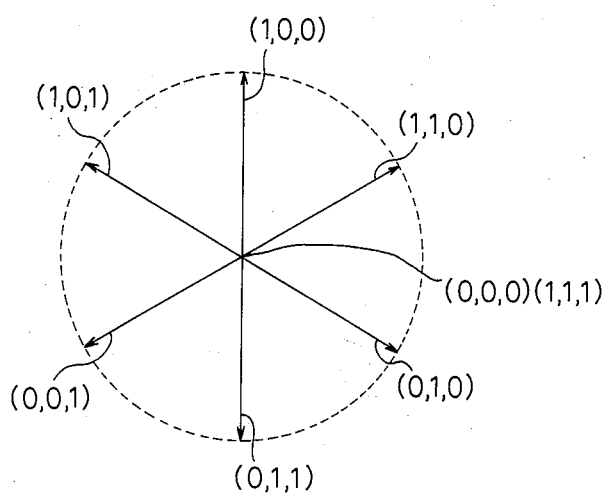
FIG. 7 shows the kinds of the line voltage vectors obtained in accordance with each switching pattern.
Figure 8:
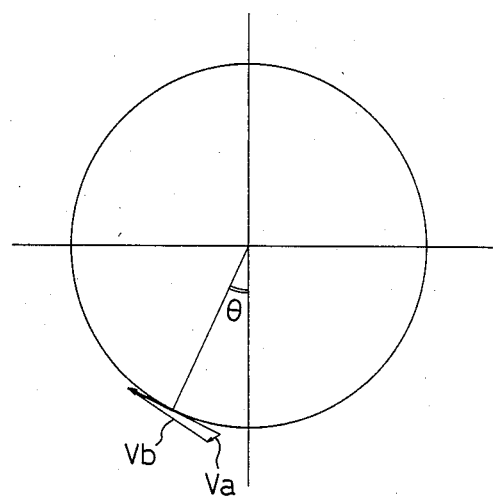
FIG. 8 shows a fundamental method of summing vectors.
Figure 9:
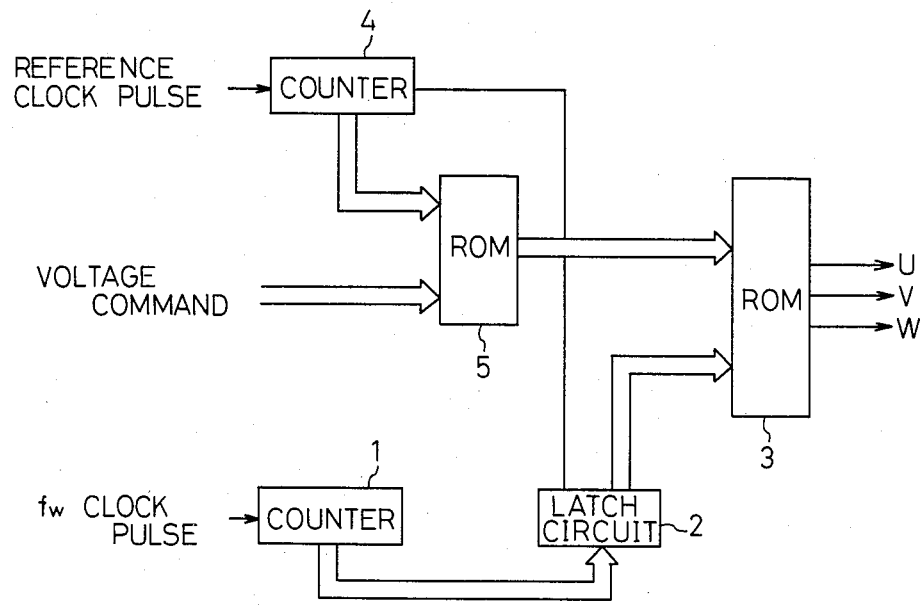
FIG. 9 is a block diagram of the prior art control circuit.

One embodiment will now be described with reference to FIGS. 1-5. First, in the embodiment, on-off control of respective switching elements $S_1$-$S_6$ will be achieved in accordance with the switching patterns in which the output voltage resultant vectors of a three phase motor in an inverter shown in FIG. 6 form a circular locus. In order to provide the above-described on-off control of respective switching elements, consider a vector V directed from point a of phase $\theta_1$ to point b of phase $\theta_2$, as shown in FIG. 3. On the other hand, select two out of eight kinds of line voltage resultant vectors shown in FIG. 7. Split the vector V into two vectors $V_1$ and $V_2$ which have the same direction as those of the selected line voltage resultant vectors. In order to obtain the vectors $V_1$ and $V_2$, three phases of the motor are sequentially energized for respective predetermined period of time in accordance with the switching patterns in which the selected line voltage resultant vectors are gained. Each line voltage resultant vector obtained in accordance with eight kinds of switching patterns is represented, for example, as (0, 1, 1). Three numerals refer to the motor phases U, V and W respectively, and numeral 0 denotes that the phase is turned off and numeral 1 denotes that the phase is turned on.

Figure 4:
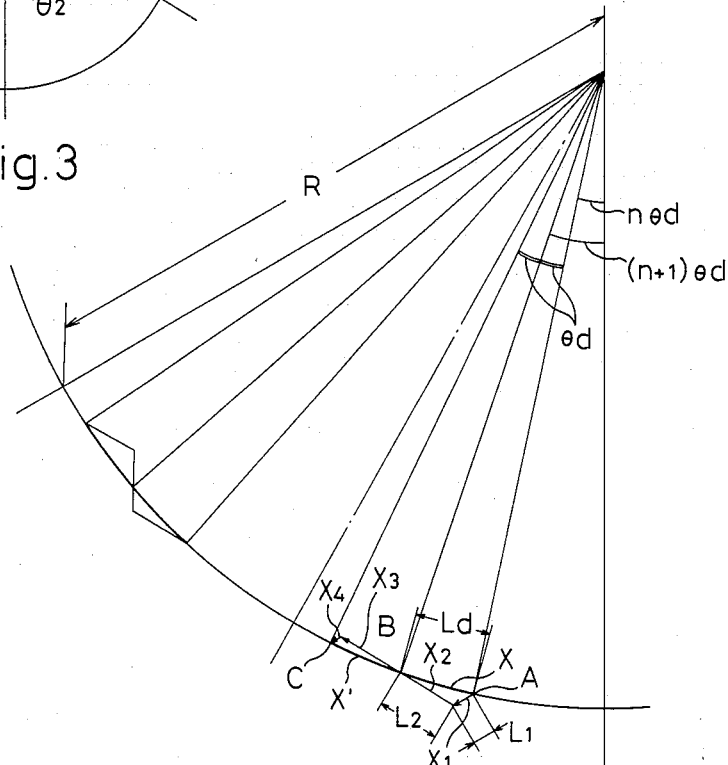
FIG. 4 is a representation of vector analysis to determine each switching pattern of each phase and each period of time during which the motor is energized in accordance with each switching pattern.

The following is the description of a method of determining the switching patterns in which the motor phases are energized for the predetermined period of time in accordance with the above-described principle. First, a circle with radius R is equally divided into six sections. The value of the radius R will be referred to hereafter. Consider a section from 0° to 60° among those which each have equally divided electrical angle 60°, as shown in FIG. 3. When the section from 0° to 60° is further divided into m parts, each angle between every two adjacent dividing lines is represented as 60/m. Then consider a vector X directed from point A of the phase $n\theta d$ to point B of the phase $(n+1)\theta d$ (where $(n+1)$ $\theta d \leq 30°$) on the circle with the radius R, as shown in FIG. 4. Split the vector X into two vectors $X_1$ and $X_2$ which are directed in the same direction as the line voltage resultant vectors (0, 0, 1) and (1, 0, 1) respectively. Where the straight distance between the points A and B is represented as Ld, the lengths $L_1$ and $L_2$ of respective vectors $X_1$ and $X_2$ are gained by the following expressions;

$$L_1 = Ld\{(1/\sqrt{3})\cos[(2n + 1)/2]\theta d - \sin[(2n + 1)/2]\theta d\} \quad (1)$$

$$L_2 = Ld\{(1/\sqrt{3})\cos(2n + 1)/2]\theta d + \sin(2n + 1)/2]\theta d\} \quad (2)$$

where
$Ld = 2R \sin(\theta d/2)$
$R = V1/(2\pi f)$ where f=output frequency and V=fundamental wave of output line voltage The periods of time during which the motor phases are energized with the line voltage resultant vectors (0, 0, 1) and (1, 0, 1) formed to obtain the vectors $X_1$ and $X_2$ are respectively denoted as follows:

$$t_1 = T(V^l/Vd)\{(1/\sqrt{3})\cos[(2n + 1)/2]\theta d - \sin[(2n + 1)/2]\theta d\} \quad (3)$$

$$t_2 = T(V^l/Vd)\{(1/\sqrt{3})\cos[(2n + 1)/2]\theta d + \sin[(2n + 1)/2]\theta d\} \quad (4)$$

where
T=time period of unit section $\theta d$
Vd=DC voltage of the inverter
The locus of the vector X is not moved during the period of time $[T=(t_1+t_2)]$, which period of time is represented as the line voltage resultant vector (0, 0, 0) or (1, 1, 1). Where $t_0$ denotes the period of time $[T-(t_1+t_2)]$, $t_0$ is obtained by the following expression:

$$t_0 = T - T(V^l/Vd)(2/\sqrt{3})\cos[(2n + 1)/2]\theta d \quad (5)$$

Accordingly, the three phase output voltage resultant vector moves from point A to point B on the circle with radius R where the motor phases are first energized for the time period $t_0$ in accordance with the switching pattern in which the resultant vector (0, 0, 0) or (1, 1, 1) is obtained in the phase including point A and where the motor phases are then energized for the time period t1 in accordance with the switching pattern in which the resultant vector (0, 0, 1) is obtained and further where the motor phases are then energized for the time period $t_2$ in accordance with the switching pattern in which the resultant vector (1, 0, 1) is gained. For generalization, where the time periods $t_0$ and $(t_1 + t_0)$ are represented as the ratios of the time period T, $\alpha_0$ and $\alpha_1 + \alpha_0$, as follows:

$$\alpha_0 = t_0/T = 1 - k \cos\{[(2n + 1)/2]\theta d\} \quad (6)$$

$$\alpha_1 + \alpha_0 = (t_1 + t_0)/T = 1 - k \cos\{[(2n + 1)/2]\theta d - \pi/3\} \quad (7)$$

where k=output voltage ratio which is shown as:

$$k = (V^l/Vd)(2/\sqrt{3})$$

As the result of the expressions (6) and (7), it is understood that the output time period of each switching pattern in which the resultant vectors (0, 0, 0) or (1, 1, 1), (0, 0, 1) and (1, 0, 1) are gained is determined by comparing reference voltages represented as 1-k cos $\theta$ and 1-k cos $(\theta-\pi/3)$ in the range of $\pi/6$ and part of a carrier of the triangular wave having a frequency of 2T, which part is positive and upward to the right. See FIG. 2.

Then consider a vector X' directed from point B of phase $(n+1)\theta d$ to point C of phase $(n+2)\theta d$ and split the vector X' into two vectors $X_3$ and $X_4$ which have the same direction as those of the line voltage resultant vectors (1, 0, 1) and (0, 0, 1). In order to obtain the vectors $X_3$ and $X_4$, the time periods $t_3$ and $t_4$ during which the motor is energized in accordance with the switching patterns in which respective line voltage resultant vectors (1, 0, 1) and (0, 0, 1) are gained are evaluated. In order to evaluate the time periods $t_3$ and $t_4$, the ratios of the time period T to respective time periods $t_3$ and $t_3 + t_4$ are found by the following expressions:

$$\alpha_3 = k \cos\{[(2n + 1)/2]\theta d + \theta d - \pi/3\} \quad (8)$$

$$\alpha_3 + \alpha_4 = k \cos\{[(2n + 1)/2]\theta d + \theta d\} \quad (9)$$

Since $\alpha_3$ and $\alpha_3 + \alpha_4$ correspond to the lengths to the lines (1-k cos $\theta$) and 1-k cos $(\theta - \pi/3)$ respectively with the level "1" of the vertical axis as a criterion, it is understood that the time periods during which the motor phases are energized in accordance with the switching patterns in which the line voltage resultant vectors (0, 0, 1) and (1, 0, 1) are obtained are determined after comparing 1-k cos $\theta$ and 1-k cos $(\theta-\pi/3)$ with part of the carrier of the triangular wave which is negative and downward to the right.

The above description refers only to the part from 0° to 30° of the section from 0° to 60°. In the case of the part from 30° to 60°, the expressions corresponding to those (1)-(7) are obtained in the same manner as in the part from 0° to 30° except that two line voltage resultant vectors (1, 0, 1) and (1, 0, 0) are selected.

The above-described operation is performed with respect to each divided section of 60°. In this case, each divided section of 60 is obtained by changing the switching patterns and the turn-on time period in each switching pattern is obtained by cmparing 1-k cos $\theta$ and 1-k cos $(\theta-\pi/3)$, both shown in FIG. 1, with the carrier of the triangular wave. Consequently, where 1-k cos $\theta$ and 1-k cos $(\theta-\pi/3)$ are compared with the carrier of the triangular wave in each one-sixth cycle of output frequency and where the motor phases are energized for the predetermined period of time in accordance with the determined switching patterns and in accordance with phase $\theta$, the locus of three phase output voltage resultant vectors becomes a circle with radius R.

Figure 1:
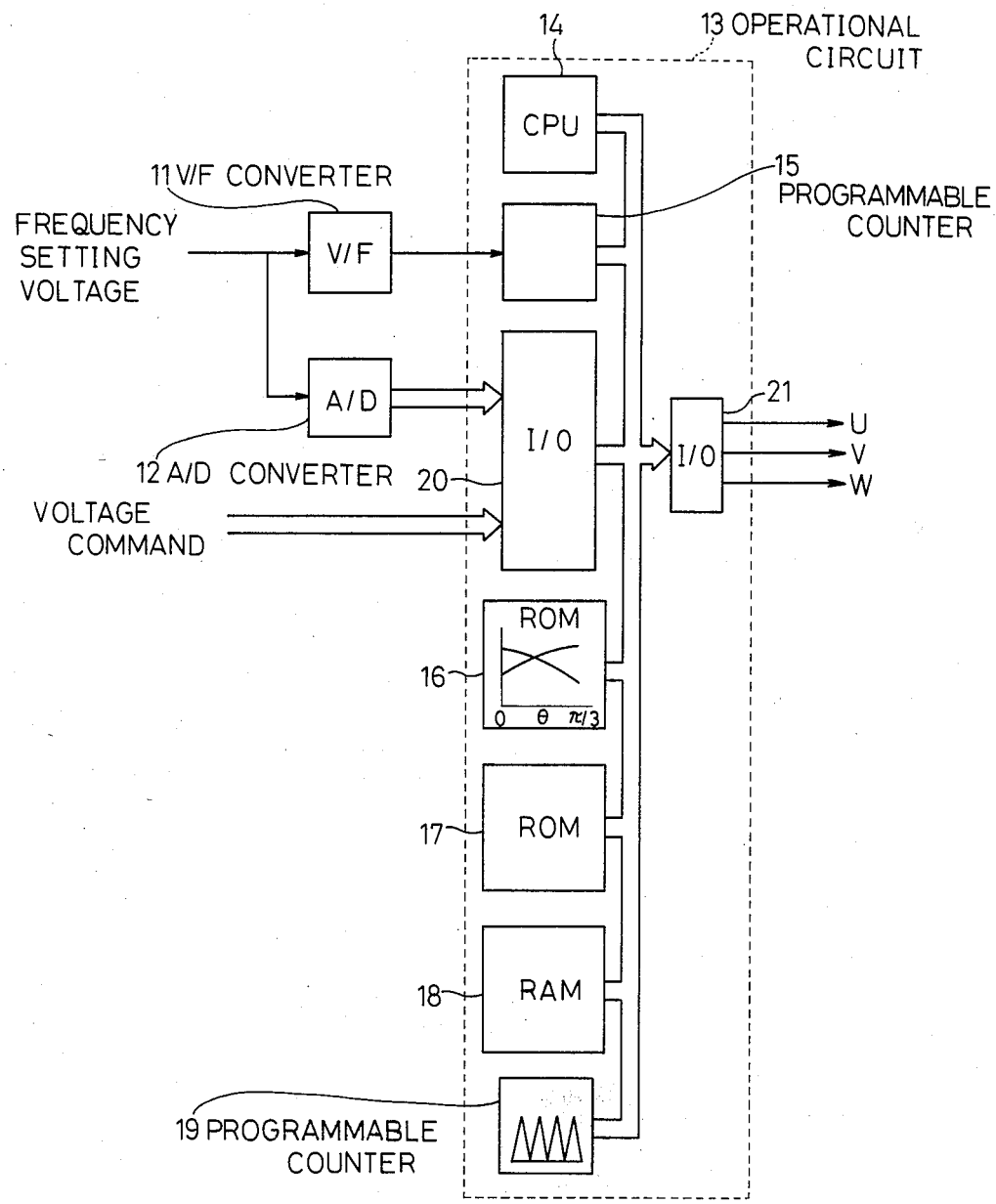
FIG. 1 is a block diagram of a control circuit employed in the system of the embodiment in accordance with this invention.
Figure 2:
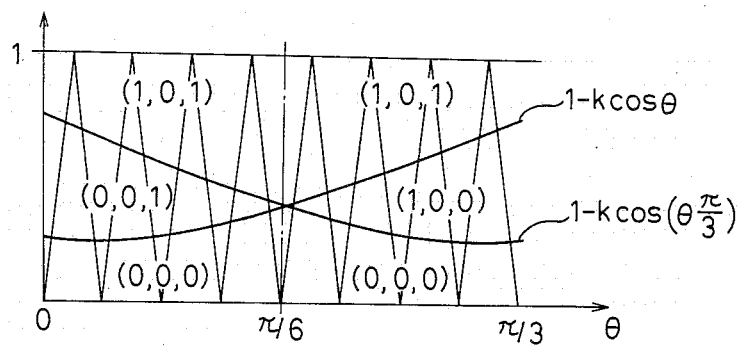
FIG. 2 is a graphical representation of a principle to determine each switching pattern in each phase and the period of time during which the motor is energized in accordance with each switching pattern.

The control circuit will now be described with reference to FIG. 1. A voltage-frequency converting circuit (hereinafter referred to as V/F converter) 11 and an analog-digital converting circuit (hereinafter referred to as A/D converter) 12 convert the frequency-setting voltage to a pulse signal f$\omega$ and digital quantity f having a frequency proportional to the frequency-setting voltage. A one-chip micro computer 13 incorporates a micro processor or central processing unit 14, hereinafter referred to as CPU, a programmable counter 15, ROM's 16 and 17, a random access memory 18 hereinafter referred to as RAM, a programmable counter 19 as a programmable timer, an input port 20, and an output port 21. The programmable counter 15 receives the pulse signal f$\omega$ supplied from the V/F converter 11 and the pulse signal f$\omega$ is divided by a set frequency-divided ratio to thereby supply the CPU 14 with an interruption signal. Data of the value of cos $\theta$ as data of a first time period ratio and data of cos $(\theta-\pi/3)$ as data of a second time period ratio in accordance with the phase $\theta$ in the range of electrical angle from 0° to 60° are stored in the ROM 16. There is stored in the ROM 17 a data table of the switching patterns by which eight kinds of line voltage resultant vectors are obtained and a program according to which the values of 1-k cos $\theta$ and 1-k cos $(\theta-\pi/3)$ are found based on the values of cos $\theta$ and cos $(\theta-\pi/3)$ the data of which is stored in the ROM 16.

The digital quantity and voltage command (corresponding to output voltage rate k) are supplied from the A/D converter 12 to the input port 20. The CPU 14 operates to find the current phase $\theta$ and the time period T from the digital quantity f and the voltage command k and further each period of time during which the motor phases are turned on in accordance with each switching pattern. Thus, the micro computer 13 functions as an operational circuit. The counter 19, provided for producing data of the triangular wave, counts the turn-on time periods in accordance with each switching pattern found by the CPU 14 and supplies the CPU 14 with an interruption signal every time when each turn-on time period elapses.

The following is a description of a method of supplying pulse width modulation signals in accordance with the above-described circuit arrangement. In the programmable counter 15, the clock pulse f$\omega$ is divided by the frequency-dividing ratio set in a manner which will be described hereafter, thereby providing a clock signal as the interruption signal to be supplied to the CPU 14. The interruption signal is provided in each unit section $\theta$d.

Figure 5:
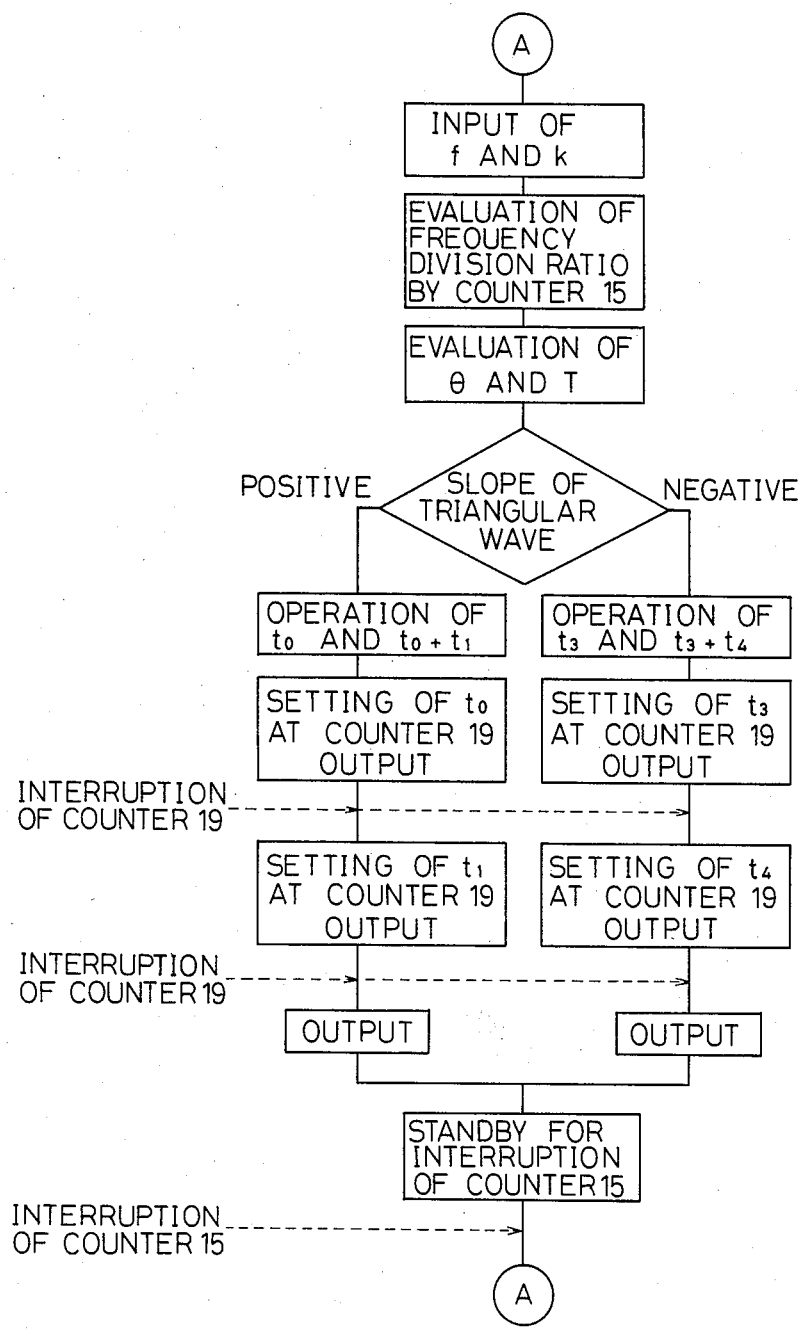
FIG. 5 is a flow chart showing the operation of the system in accordance with this invention.

The CPU 14 performs operational processing in accordance with an interuption routine shown in FIG. 5 every time when receiving the interruption signal. In the interruption routine, when the interruption signal is provided from the programmable counter 15, the frequency dividing ratio is first found in the ROM 17 based on the digital quantity f and voltage command k supplied from the A/D converter 12 as the frequency signal. Then the current phase $\theta$ and the time period T of the unit section $\theta$d are found at the ROM 16. Where the triangular wave which is compared with 1-k cos $\theta$ and 1-k cos $(\theta-\pi/3)$ is upward to the left, in the current phase $\theta$ found, the values of $t_0$ and $t_0+t_1$ are found in accordance with the expressions (6) and (7). The value of $t_0$ is set in the programmable counter 19 by the CPU 14. Data of a predetermined switching pattern is supplied from the data table of the ROM 17 to the RAM 18, which supplies the output port 21 with the data of the predetermined switching pattern. When the programmable counter 19 performs the counting operation corresponding to the time period $t_0$, the interruption signal is supplied from the programmable counter 19 to the CPU 14, whereby time period $t_1(t_0+t_1-t_0)$ is set at the programmable counter 19 by the CPU 14. Simultaneously, data of the next switching pattern is supplied from the data table of the ROM 17 to the RAM 18 and further supplied to the output port 21. When the programmable counter 19 finishes the counting operation corresponding to the time period $t_1$, the interruption signal is supplied from the programmable counter 19 to the CPU 14. Then, the data of the next switching pattern is supplied from the ROM 17 to the RAM 18 and the data of the next switching pattern is supplied further to the output port 21. In this state, the programmable counter 15 is on standby for the triangular wave which is compared with 1-k cos $\theta$ and 1-k cos $(\theta-\pi/3)$ negative and downward to the right after the current phase $\theta$ and the time period T are found, the values of $t_3$ and $t_3+t_4$ are found in accordance with the expressions (8) and (9). Then, as described above, the motor phases are energized for the time period $t_3$ in accordance with a selected switching pattern. After interruption by the programmable counter 19, the motor phases are energized for the time period $t_3$ in accordance with a next switching pattern. After interruption by the programmable counter 19 again, the motor phases are energized in accordance with further next switching pattern. In this state of condition, the programmable counter 15 is on standby for the interruption signal. When the time period T elapses, the interruption signal is supplied from the programmable counter 15 to the CPU 14. Thus, the supply of pulse width modulation signals in one section $\theta$d is completed and the pulse width modulation signals are sequentially supplied in each of the other sections in the same manner as described above. Data of three kinds of time periods (for example, $t_0$, $t_1$, and $t_2$) dividing the half cycle T of the triangular wave into three intervals at each half cycle T can sequentially be obtained. Three kinds of switching patterns are selected at each range of 60°. The period selecting the switching patterns depends on each of the three kinds of data of time periods. Combinations of the switching patterns are changed at each range of 60°.

According to the above-described system, since the data of the values of cos $\theta$ and cos $(\theta - \pi/3)$ in the range of electrical angle of 60°, the data of switching patterns and the operational programs of 1-k cos $\theta$ and 1-k cos $(\theta - \pi/3)$ are stored in the ROM's 16 and 17 respectively, several K bytes are required of respective ROM's 16, 17. Consequently, the control circuit becomes inexpensive and simple as compared with the prior art control circuits. Furthermore, the resolution of the phase $\theta$ becomes six times as fast as in the prior art, so that the accuracy is highly improved.

Although the invention is applied to a synchronous computer in the above-described embodiment, the invention may be applied to an asynchronous computer by changing the time period T into a predetermined value and processing the counted value by the programmable counter 15 as a phase $\theta$. In this case, the A/D converter 12 is eliminated. Where the data of the resolution between frequency and voltage command is stored in the ROM's, the voltage command k is eliminated.

Although the invention has been described with a certain degree of particularity, it is understood that the present disclosure has been made only by way of example and that numerous changes in the details of construction and the combination and arrangement of parts may be resorted to without departing from the scope and spirit of the invention. Thus, the scope of the invention should not be limited by the foregoing description, but rather, only by the scope of the claim appended hereto.

What is claimed is:

1. A pulse width modulation system for AC motor drive inverters comprising:
   (a) first means for storing data of eight combinations of switching pattern signals representing combinations of on-off conditions of three switching elements;
   (b) second means for storing data of a first time period ratio represented as cos $\theta$ corresponding to a phase $\theta$ in the range of from 0° to 60° of an electrical angle and data of a second time period ratio represented as cos $(\theta - \pi/3)$;
   (c) third means for producing data of a triangular wave, the cycle of which is 2T where T represents a time period of the electrical angle of 30° or less;
   (d) fourth means for sequentially obtaining data of three kinds of time periods by dividing the cycle T into three intervals at each cycle T by comparing the data of the triangular wave with the data of the first and second time period ratios while the first and second time period ratios change depending on $\theta$ in the range from 0° to 60° of the electrical angle; and
   (e) fifth means for operating said fourth means repeatedly so that sequential formation of three predetermined switching patterns for time periods determined by the data of the three kinds of time periods produced sequentially is reiterated at 60° phase increments.

* * * * *